US008212505B2

(12) United States Patent
Nagashima et al.

(10) Patent No.: US 8,212,505 B2
(45) Date of Patent: Jul. 3, 2012

(54) METHOD AND SYSTEM FOR CREATING A VIBRATION IN AN AUTOMOBILE (75) Inventors: James M. Nagashima, Cerritos, CA (US); Steven E. Schulz, Torrance, CA (US); Yo Chan Son, Torrance, CA (US); Jonas Bereisa, Bloomfield Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 492 days.

(21) Appl. No.: 12/326,259

(22) Filed: Dec. 2, 2008

(65) Prior Publication Data
US 2010/0134058 A1    Jun. 3, 2010

(51) Int. Cl.
H02P 6/10    (2006.01)
(52) U.S. Cl. ............. 318/400.23; 318/139; 318/400.01; 318/700; 180/54.1; 180/65.1; 180/65.21; 180/65.275; 180/65.285
(58) Field of Classification Search .................. 318/139, 318/700, 400.01, 400.23; 180/54.1, 65.1, 180/65.21, 65.275, 65.285
See application file for complete search history.

(56) References Cited

U.S. PATENT DOCUMENTS

| 2003/0142963 A1* | 7/2003 | Nadeau ........................ 388/804 |
| 2005/0077878 A1* | 4/2005 | Carrier et al. ................. 320/134 |
| 2005/0187735 A1 | 8/2005 | Nemeth-Csoka et al. |
| 2005/0231142 A1* | 10/2005 | Yoshinaga et al. ............ 318/254 |
| 2005/0231143 A1 | 10/2005 | Yoshinaga et al. |
| 2007/0216339 A1* | 9/2007 | Yoshimoto et al. ........... 318/800 |
| 2008/0180059 A1* | 7/2008 | Carrier et al. ................. 320/112 |
| 2009/0146614 A1* | 6/2009 | Carrier et al. ................. 320/152 |

FOREIGN PATENT DOCUMENTS

DE    102004008250 A1    10/2005
DE    102005017074 A1    12/2005

OTHER PUBLICATIONS

Bianchi, N, et al. "Comparison of PM Motor Structures and Sensorless Control Techniques for Zero-Speed Rotor Position Detection," IEEE Transactions on Power Electronics, Nov. 2007, pp. 2466-2475, vol. 22, No. 6.
Corley, M.J., et al. "Rotor Position and Velocity Estimation for a Salient-Pole Permanent Magnet Synchronous Machine at Standstill and High Speeds," IEEE Transactions on Industry Applications, Jul./Aug. 1998, pp. 784-789, vol. 34, No. 4.
Ha, J-I., et al. "Sensorless Rotor Position Estimation of an Interior Permanent-Magnet Motor from Initial States," IEEE Transactions on Industry Applications, May/Jun. 2003, pp. 761-767, vol. 39, No. 3.

* cited by examiner

*Primary Examiner* — Walter Benson
*Assistant Examiner* — Kawing Chan
(74) *Attorney, Agent, or Firm* — Ingrassia Fisher & Lorenz P.C.

(57) ABSTRACT

A method and system for operating an automotive electric motor having first and second components is provided. A desired frequency of vibration for the electric motor is selected. A current is caused to flow through at least one of the first and second components such that the second component moves relative to the first component. The current is modulated such that the motor vibrates at the desired frequency.

18 Claims, 5 Drawing Sheets

METHOD AND SYSTEM FOR CREATING A VIBRATION IN AN AUTOMOBILE

TECHNICAL FIELD

The present invention generally relates to automobiles, and more particularly relates to a method and system for creating vibrations in automobiles.

BACKGROUND OF THE INVENTION

In recent years, advances in technology, as well as ever-evolving tastes in style, have led to substantial changes in the design of automobiles. One of the changes involves the complexity of the electrical systems within automobiles, particularly alternative fuel vehicles, such as hybrid, battery electric, and fuel cell vehicles. Such alternative fuel vehicles typically use one or more electric motors, perhaps in combination with another actuator, to drive the wheels.

One of the advantages of driving the wheels with the electric motor is generally considered to be that the electric motors are relatively quiet, which provides for a comfortable driving experience. However, this also makes it difficult to hear the automobile to people outside the automobile, such as pedestrians, which may be undesirable in certain situations.

Accordingly, it is desirable to provide a method and system for creating a sound (and/or vibration) in an automobile using an electric motor that is also used to provide power to the wheels. Furthermore, other desirable features and characteristics of the present invention will become apparent from the subsequent description taken in conjunction with the accompanying drawings and the foregoing technical field and background.

SUMMARY OF THE INVENTION

A method for operating an automotive electric motor having first and second components is provided. A desired frequency of vibration for the electric motor is selected. A current is caused to flow through at least one of the first and second components such that the second component moves relative to the first component. The current is modulated such that the motor vibrates at the desired frequency.

A method for operating an automotive electric motor is provided. The electric motor includes a stator with at least one winding and a rotor with at least one magnet and that is rotatably coupled to the stator. A desired frequency of vibration for the electric motor is selected. A current is caused to flow through the at least one winding such that a toque is applied to the rotor that causes the rotor to rotate relative to the stator. The current is modulated such that the motor vibrates at the desired frequency.

An automotive drive system is provided. The automotive drive system includes an electric motor having a stator with at least one winding and a rotor with at least one magnet and being rotatably coupled to the stator, a direct current (DC) power supply coupled to the electric motor, a power inverter comprising at least one transistor and coupled to the electric motor and the DC power supply to receive DC power from the DC power supply and provide alternating current (AC) power to the electric motor, and a controller. The controller is in operable communication with the electric motor, the DC power supply, and the power inverter. The controller is configured to receive a signal representative of a desired frequency of vibration for the electric motor, operate the at least one transistor so as to cause a current to flow through the at least one winding such that a toque is applied to the rotor that causes the rotor to rotate relative to the stator, and modulate the current such that the electric motor vibrates at the desired frequency.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, and brief summary, or the following detailed description.

The following description refers to elements or features being "connected" or "coupled" together. As used herein, "connected" may refer to one element/feature being mechanically joined to (or directly communicating with) another element/feature, and not necessarily directly. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Further, various components and features described herein may be referred to using particular numerical descriptors, such as first, second, third, etc., as well as positional and/or angular descriptors, such as horizontal and vertical. However, such descriptors may be used solely for descriptive purposes relating to drawings and should not be construed as limiting, as the various components may be rearranged in other embodiments. It should also be understood that FIGS. 1-5 are merely illustrative and may not be drawn to scale.

FIG. 1 to FIG. 5 illustrate a method and system for operating an automotive electric motor having first and second components. A desired frequency of vibration for the electric motor is selected. A current is caused to flow through at least one of the first and second components such that the second component moves relative to the first component. The current is modulated such that the motor vibrates at the desired frequency.

Figure 1:
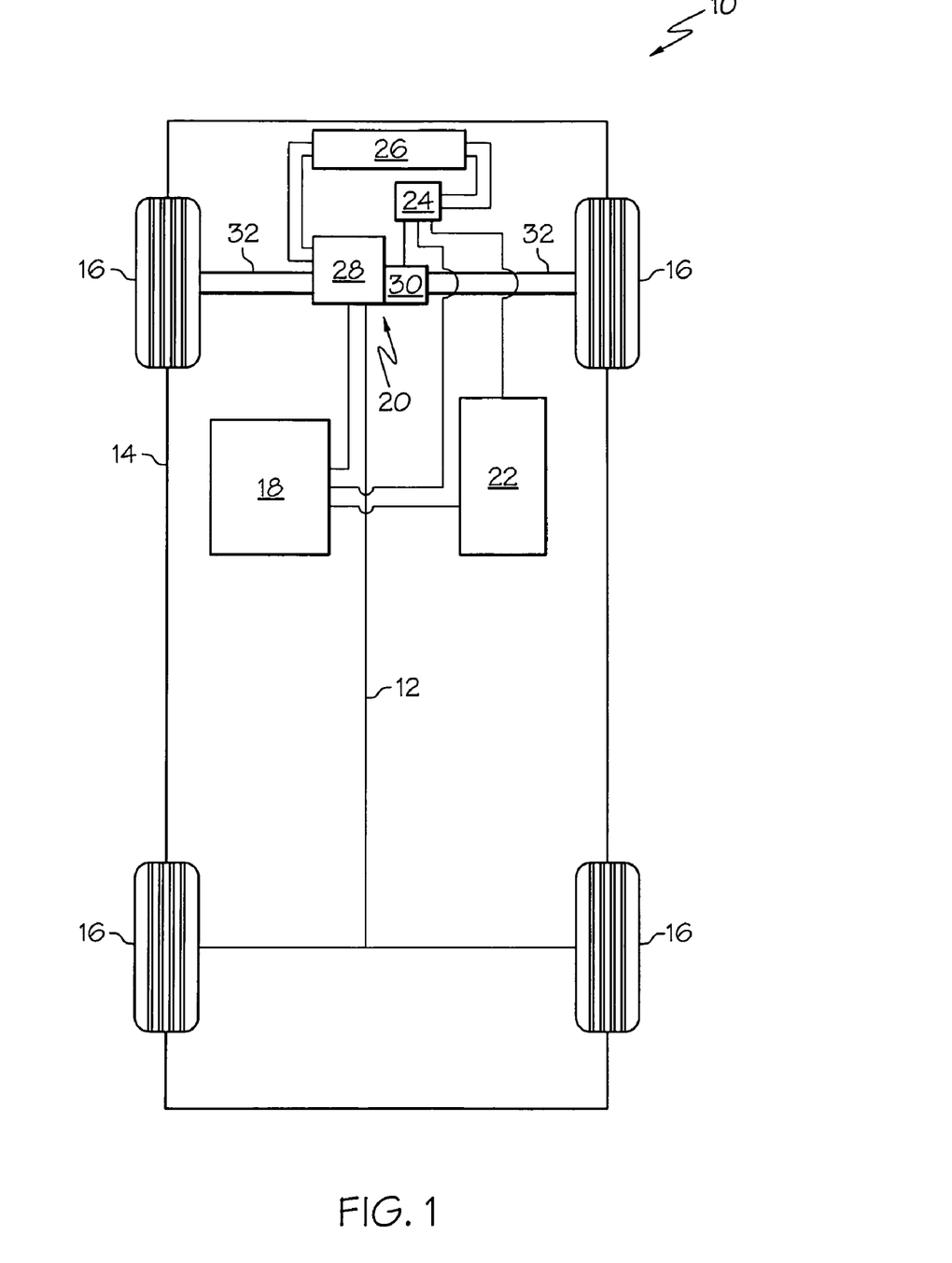
FIG. 1 is a schematic view of an exemplary automobile according to one embodiment of the present invention.

FIG. 1 illustrates a vehicle (or "automobile") 10, according to one embodiment of the present invention. The automobile 10 includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine (i.e., such as in a hybrid electric vehicle (HEV)), and an electric motor.

In the exemplary embodiment illustrated in FIG. 1, the automobile 10 is an HEV, and further includes an actuator assembly 20, a battery (or a high voltage direct current (DC) power supply) 22, a power converter assembly (e.g., an inverter or inverter assembly) 24, and a radiator 26. The actuator assembly 20 includes a combustion engine 28 and an electric motor/generator (or motor) 30.

Still referring to FIG. 1, the combustion engine 28 and/or the electric motor 30 are integrated such that one or both are mechanically coupled to at least some of the wheels 16 through one or more drive shafts 32. In one embodiment, the automobile 10 is a "series HEV," in which the combustion engine 28 is not directly coupled to the transmission, but coupled to a generator (not shown), which is used to power the electric motor 30. In another embodiment, the automobile 10 is a "parallel HEV," in which the combustion engine 28 is directly coupled to the transmission by, for example, having the rotor of the electric motor 30 rotationally coupled to the drive shaft of the combustion engine 28.

The radiator 26 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the engine 28 and the inverter 24.

Referring again to FIG. 1, in the depicted embodiment, the inverter 24 receives and shares coolant with the electric motor 30. However, other embodiments may use separate coolants for the inverter 24 and the electric motor 30. The radiator 26 may be similarly connected to the inverter 24 and/or the electric motor 30.

The electronic control system 18 is in operable communication with the actuator assembly 20, the high voltage battery 22, and the inverter assembly 24. Although not shown in detail, the electronic control system 18 includes various sensors and automotive control modules, or electronic control units (ECUs), such as an inverter control module and a vehicle controller, and at least one processor and/or a memory which includes instructions stored thereon (or in another computer-readable medium) for carrying out the processes and methods as described below. Included in these instructions may be various parameters (as described below) for controlling the operation of the motor 30 and associated vibrations and/or sounds that may be known to be generated by the motor 30 and/or the automobile 10 (i.e., in a "look-up" table). These associations may be developed by operating the electric motor(s) in individual models of automobiles while varying the parameters.

Figure 2:
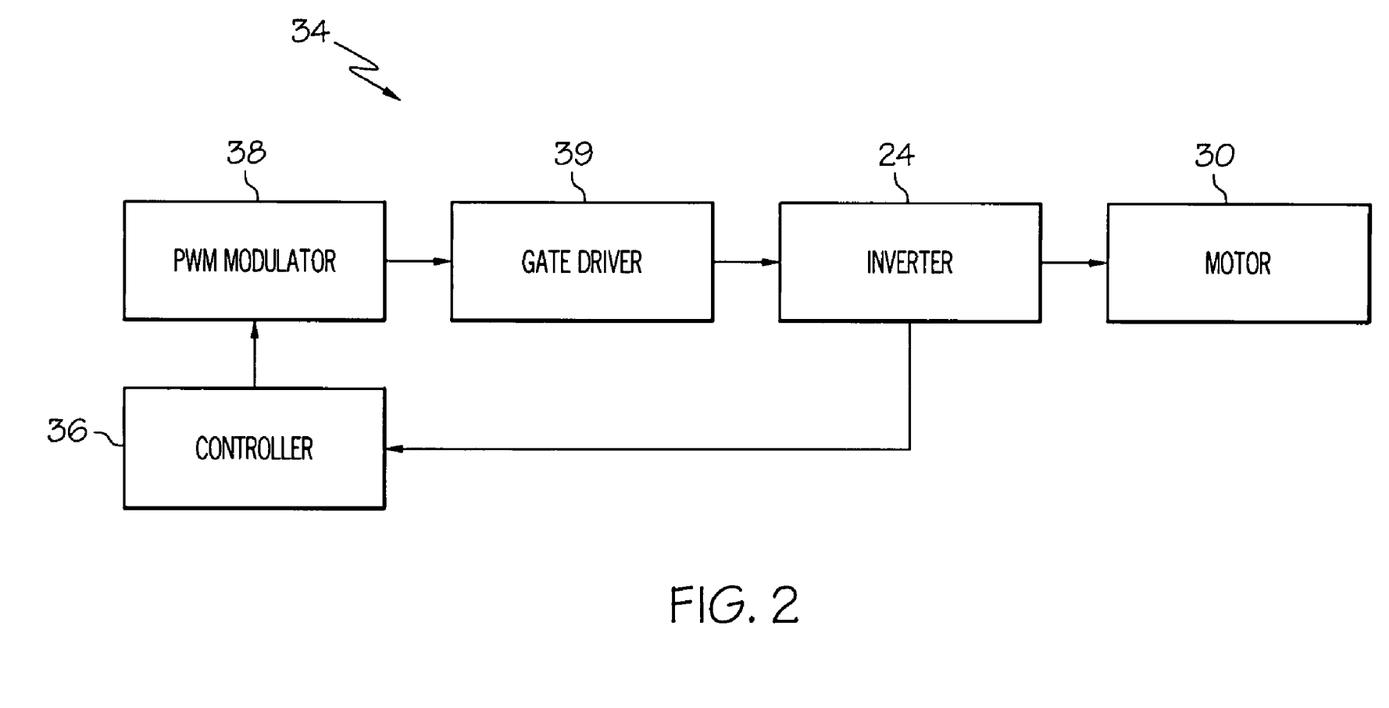
FIG. 2 is a block diagram of a voltage source inverter system within the automobile of FIG. 1.

Referring to FIG. 2, a voltage source inverter system (or electric drive system) 34, in accordance with an exemplary embodiment of the present invention, is shown. The voltage source inverter system 34 includes a controller 36 in operable communication with a Pulse Width Modulation (PWM) modulator 38 (or a pulse width modulator) and the inverter 24 (at an output thereof). The PWM modulator 38 is coupled to a gate driver 39, which in turn has an input coupled to an input of the inverter 24. The inverter 24 has a second output coupled to the motor 30. The controller 36 and the PWM modulator 38 may be integral with the electronic control system 18 shown in FIG. 1.

Figure 3:
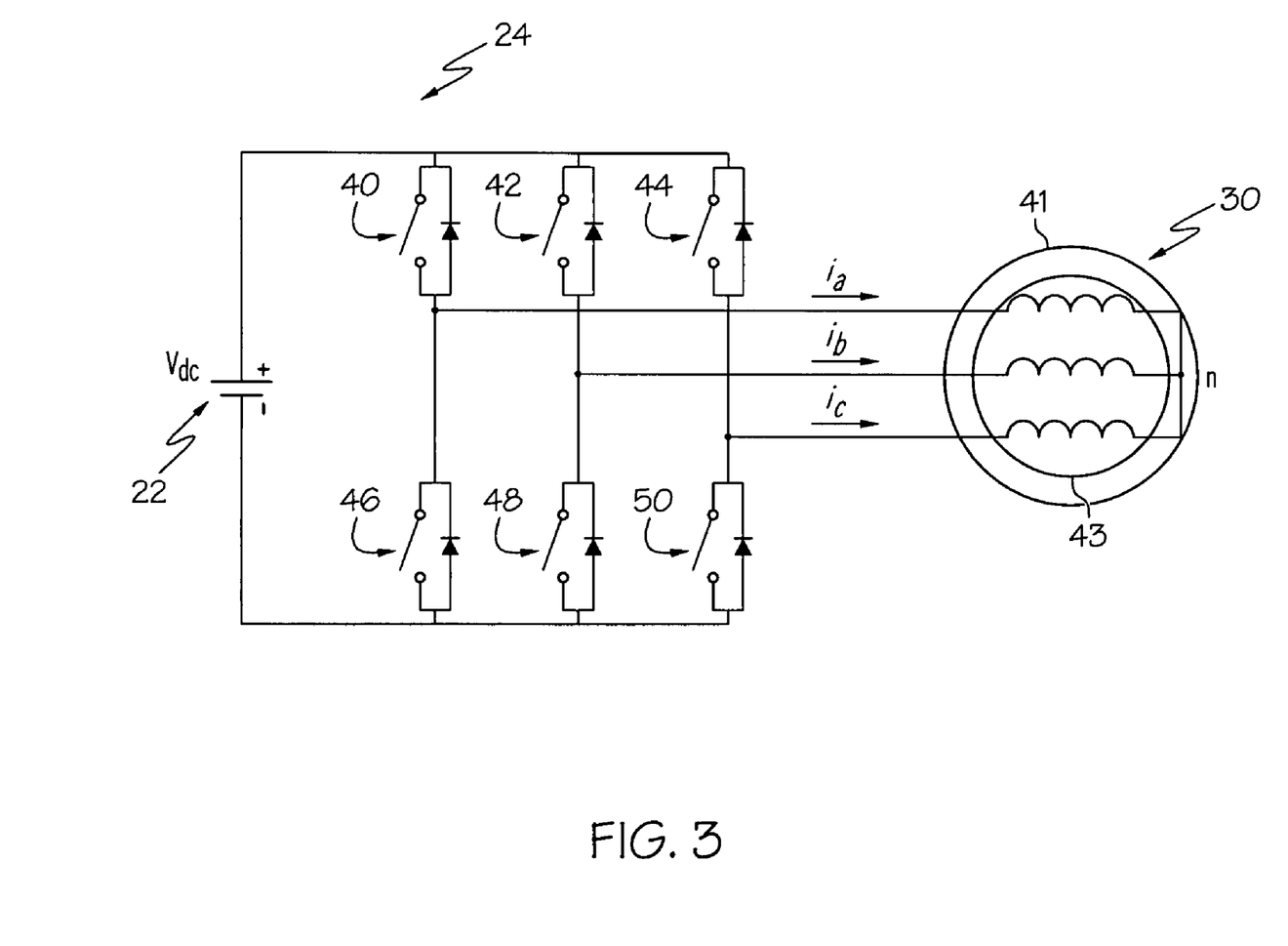
FIG. 3 is a schematic view of a voltage source, an inverter, and an electric motor within the automobile of FIG. 1.

FIG. 3 schematically illustrates the battery 22, the inverter 24 (or power converter), and the motor 30 of FIGS. 1 and 2 in greater detail. The inverter 24 includes a three-phase circuit coupled to the motor 30. More specifically, the inverter 24 includes a switch network having a first input coupled to the battery 22 (i.e., a voltage source ($V_{dc}$)) and an output coupled to the motor 30. Although a single voltage source is shown, a distributed DC link with two series sources may be used.

As will be appreciated by one skilled in the art, the electric motor 30, in one embodiment, includes a stator assembly 41 (including conductive coils or windings) and a rotor assembly 43 (including a ferromagnetic core and/or magnets), as well as a transmission and a cooling fluid (not shown). The stator assembly 41 and/or the rotor assembly 43 within the electric motor 30 may include multiple electromagnetic poles (e.g., sixteen poles), as is commonly understood. It should be understood that the description provided above is intended as example of one type of electric motor that may be used. One skilled in the art will appreciate that the techniques described below may be applied to any type of electric motor.

The switch network comprises three pairs (a, b, and c) of series switches with antiparallel diodes (i.e., antiparallel to each switch) corresponding to each of the phases of the motor 30. Each of the pairs of series switches comprises a first switch, or transistor, (i.e., a "high" switch) 40, 42, and 44 having a first terminal coupled to a positive electrode of the voltage source 22 and a second switch (i.e., a "low" switch) 46, 48, and 50 having a second terminal coupled to a negative electrode of the voltage source 22 and a first terminal coupled to a second terminal of the respective first switch 40, 42, and 44. As is commonly understood, each of the switches 40-50 may be in the form of individual semiconductor devices such as insulated gate bipolar transistors (IGBTs) within integrated circuits formed on semiconductor (e.g. silicon) substrates (e.g., die).

Figure 4:
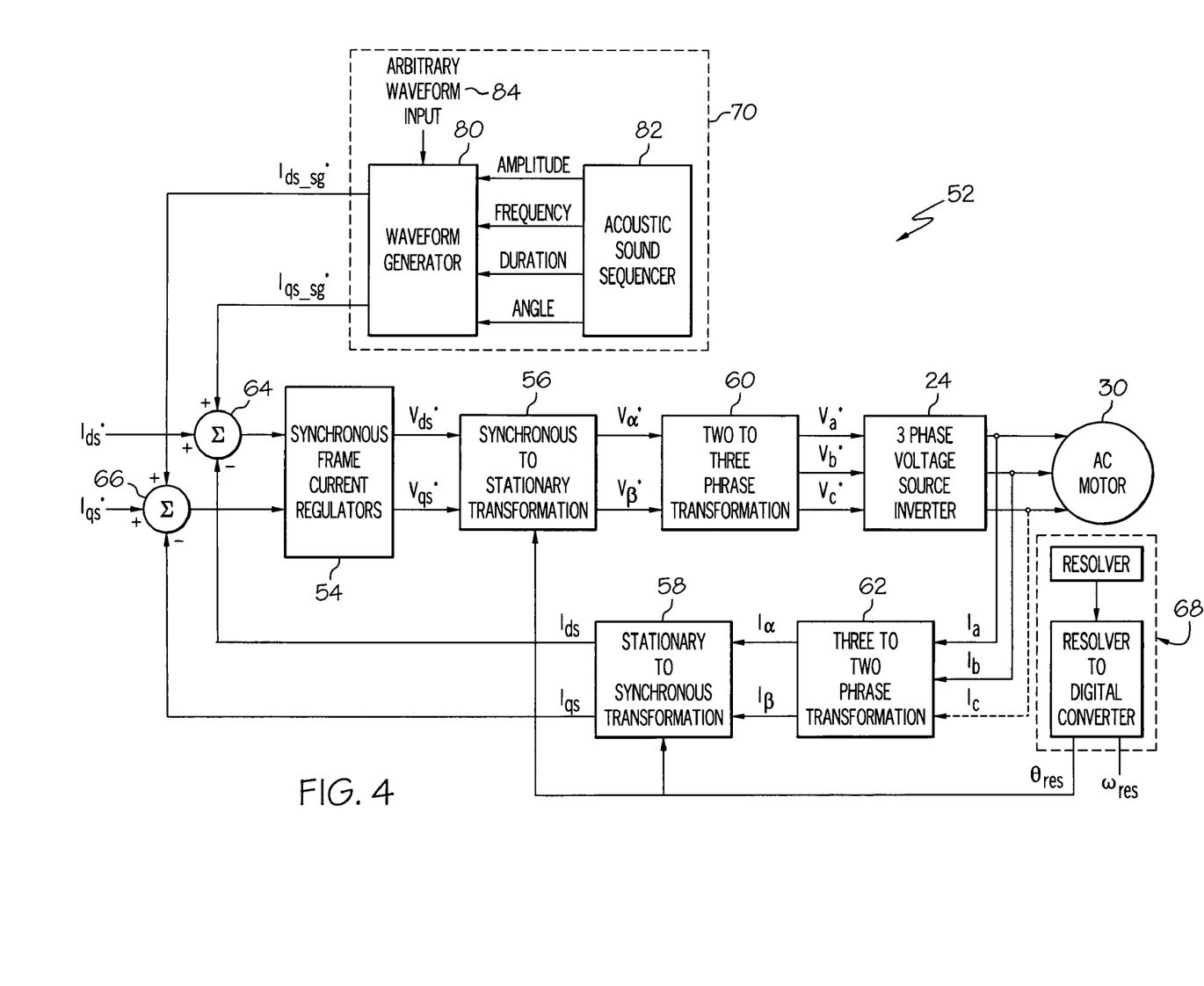
FIG. 4 is a schematic block diagram of an electric motor drive system.

FIG. 4 schematically illustrates an electric motor drive system 52, according to one embodiment of the present invention. The motor drive system 52 includes current regulators 54, rotational transformation blocks 56 and 58, a phase conversion blocks 60 and 62, the power inverter 24 (including the PWM modulator 38), the motor 30, summers 64 and 66, a position detector 68, and a vibration system 70. As will be understood by one skilled in the art, blocks 54-62, the summers 64 and 66, and the vibration system 70 may be implemented within the electronic control system as instruction stored on the computer-readable medium. Although not shown in detail, the position detector 68 may include a resolver with a digital output (e.g., a rotary encoder) that is configured to detect the angular position of the rotor within the electric motor 30, as is commonly understood.

During operation, referring to FIGS. 1 and 2, the automobile 10 is operated by providing power to the wheels 16 with the combustion engine 28 and the electric motor 30 in an alternating manner and/or with the combustion engine 28 and the electric motor 30 simultaneously. In order to power the electric motor 30, DC power is provided from the battery 22 (and, in the case of a fuel cell automobile, a fuel cell) to the inverter 24, which converts the DC power into alternating current (AC) power, before the power is sent to the electric motor 30. As will be appreciated by one skilled in the art, the conversion of DC power to AC power is substantially performed by operating (i.e., repeatedly switching) the transistors within the inverter 24 at a "switching frequency" ($F_{sw}$), such as, for example, 12 kilohertz (kHz). Generally, the controller 36 produces a Pulse Width Modulation (PWM) signal for controlling the switching action of the inverter 24. The inverter 24 then converts the PWM signal to a modulated voltage waveform for operating the motor 30.

According to one aspect of the present invention, the vibration system 70 (FIG. 4) modulates the current provided to the windings of the electric motor 30 such that the motor 30 vibrates at a desired frequency. This frequency may be either within or below the range of human hearing (e.g., 20-20,000 Hz). Frequencies within the human range of human hearing may be selected such that the vibration of the motor 30, along with vibrations of the other components of the automobile 10 caused by the vibration of the motor 30, produces sound waves within the automobile 10 (e.g., within the engine compartment). Frequencies lower than 20 Hz may also be used to create a feeling of vibration within the cabin of the automobile 10 (e.g., to simulate the vibration caused by a large ICE).

Referring again to FIG. 4, a torque command is sent from a high level controller, such as a torque controller or vehicle controller within the electronic control system 18. The torque command is transformed into current commands, $i^*_{sd}$ and $i^*_{sq}$, which are DC quantities.

In one embodiment, phase conversion block 62 transforms three-phase currents sampled from the motor, $i_a$, $i_b$, and $i_c$, into two-phase currents. However, in other embodiments, two of the currents are sampled and the third is determined using the first two currents (e.g., assuming that the currents sum to zero). The rotational transformation block 58 provides the rotational transformation (e.g., stationary to synchronous frames) with respect to the rotor position to change the two-phase AC currents, $i_\alpha$ and $i_\beta$, into two-phase DC currents, $i_{ds}$ and $i_{qs}$, which are used as current feedback at summers 64 and 66.

The difference between the current command and the current feedback drives the current regulators 54 to generate the voltage commands, $v^*_{ds}$ and $v^*_{qs}$, which are also DC quantities.

An inverse-rotational transform (e.g., synchronous to stationary frames) from $v^*_{sd}$ and $v^*_{sq}$ to $v^*_\alpha$ and $v^*_\beta$ with respect to the rotor position $\theta_{res}$, as received from the position detector 68, is performed by rotational transformation block 56. These two-phase AC voltage commands, $v^*_\alpha$ and $v^*_\beta$, are then transformed into three-phase AC quantities by phase conversion block 60 and used by the inverter 34 to drive the motor 30.

Figure 5:
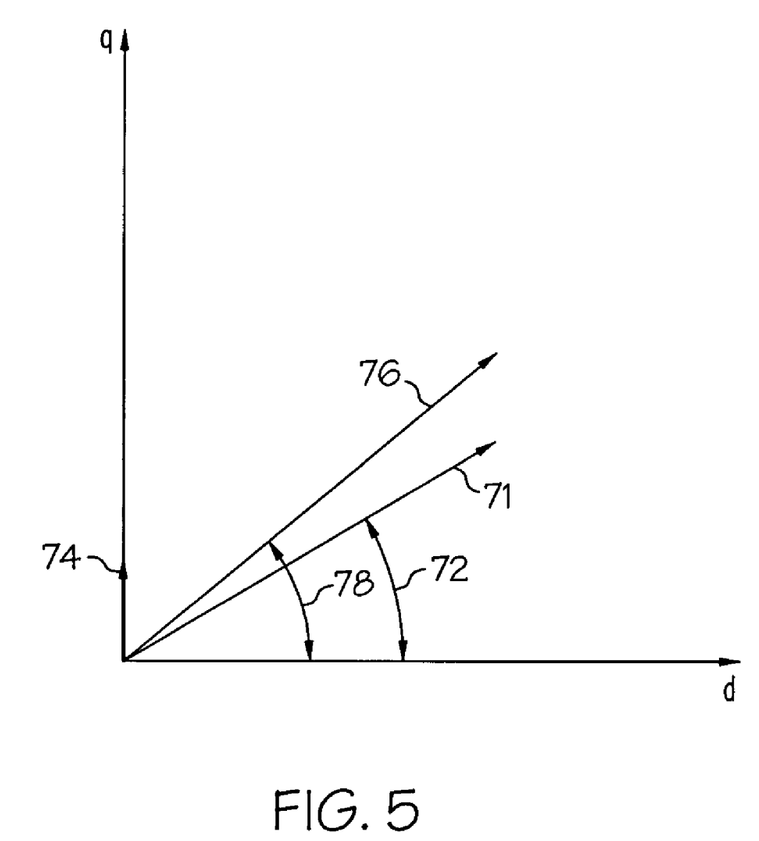
FIG. 5 is a Cartesian coordinate system illustrating various motor currents vectors within a synchronous frame of reference.

FIG. 5 illustrates a Cartesian coordinate system representing the synchronous (d-q) frame of reference for the operation of an electric motor in accordance with one aspect of the present invention. During normal operation, the stator current may be represented by a stationary vector ($I_n$) 71 at a first current control angle 72. As will be appreciated by one skilled in the art, the current control angle is conventionally adjusted to maximize the torque that is applied to the rotor 43 as the current flows through the stator 41 (FIG. 3).

Referring again to FIG. 4, in response to receiving a request (e.g., from the electronic control system 18) for the electric motor 30 to vibrate at a particular frequency, the vibration system 70 modulates the synchronous frame currents (or current commands) by providing vibration currents $i^*_{qs\_sg}$ and $i^*_{ds\_sg}$ to the respective summers 64 and 66. As shown in FIG. 5, the effective result is that a vibration current vector 74 is combined with (e.g., along the q-axis) the normal operation current vector 71, resulting in a combined current vector 76 at a second current control angle 78. For steady-state operating conditions (e.g., constant speed, torque, and DC voltage), the normal operating current vector 71 is constant in the d-q reference frame. While shown in the first quadrant for illustrative purposes only, the normal operating current vector 71 may reside in any of the four quadrants, depending on the machine type and operating conditions. The vibration current vector 74, however, is a time varying quantity at the desired vibration frequency.

As shown in FIG. 4, the vibration system 70 includes a waveform generator 80 that generates the vibration currents and receives, in one embodiment, input from an acoustic sound sequencer 82 and/or an arbitrary waveform input signal 84. The acoustic sound sequencer 82 may have various sets of characteristics (such as amplitude, angle, frequency, and duration) of modulations of the vibration currents, which are suitable for producing particular vibrations, as described below. The arbitrary waveform input 84 may be a signal representative of a particular sound (e.g., a Moving Picture Experts Group Audio Layer 3 file (MP3) stored in memory). The waveform generator 80 is configured to generate and appropriately modulate the vibration currents based on the input from either or both of the acoustic sound sequencer 82 and the arbitrary waveform input signal 84. Although the depicted embodiment includes both the acoustic sound sequencer 82 and the arbitrary waveform input signal 84, some embodiments may use only one of them.

Referring now to FIGS. 4 and 5, as will be appreciated by one skilled in the art, unlike the normal current vector 71 and/or the first current control angle 72, the combined current vector 76 and/or the second current control angle 78 do not provide for the maximum amount of torque applied to the rotor at a given instant in time. Rather, the combined current vector 76 causes tangential and radial forces to be applied to the rotor 43 (and/or the stator 41) of the motor 30, in addition to the torque applied to the rotor 30.

When the vibration currents are modulated, the combined current vector 76 and/or the second current control angle 78 are modulated, as are any extraneous forces (radial or tangential) on the rotor and stator. Thus, if the vibration currents are modulated at a particular frequency, the extraneous forces on the rotor and stator will also be modulated, thus resulting in a vibration. Vibrations above approximately 20 Hz cause sound waves to be generated by the electric motor 30 and/or the other components within the automobile 10.

The characteristics of the resultant sound may be adjusted using the vibration currents $i^*_{qs\_sg}$ and $i^*_{ds\_sg}$. The amplitude of the vibrations, and thus the volume of the sound, may be adjusted by changing the amplitude of the vibration currents and the second current control angle 78. In a similar manner, changes in the frequency of the modulation of the vibration currents alter the frequency (i.e., the tone) of the sound. As such, modulating the vibration currents at a particular amplitude, current control angle, and frequency results in a particular vibration and/or sound for the duration of that particular modulation. It should be understood that the sound generated by a particular set of vibration currents may vary from one model of automobile to another, depending on various structural characteristics of the components within the automobiles.

Therefore, still referring to FIG. 4, the vibration system 70 may provide a series of vibration currents to the summers 64 and 66 such that a series of tones is "played" by the electric motor 30. The series of tones may be the melody of a song (e.g., "Ride of the Valkeries" by Richard Wagner) or a sound effect (e.g., the rumble of an eight or ten-cylinder engine).

As referred to above, in some embodiments, vibration frequencies lower than approximately 20 Hz may be used to create a vibration that is sensible to the user(s) of the automobile, such as a low frequency vibration, similar to that felt when stopped in a classic muscle car with an eight cylinder engine.

In some embodiments the volume of the series of tones may be adjusted in proportion to the automobile's power consumption and/or speed. As suggested above, the electronic control system 18 may include a means for the user to select a particular series of tones from a list stored in a memory. The vibrations induced within the motor 30 may be selected to cancel out other vibrations and/or sounds that arise within automobile 10 during operation. The vibrations may be generated in such a way as to be audible to pedestrians near the automobile 10, so as to alert the pedestrians of the automobile's presence and state of operation. Additionally, the frequencies of vibration may be selected to generate particular sounds in accordance with the performance of the vehicle. For example, if the automobile 10 is operating relatively efficiently, one series of tones (e.g., a user's selected tune) may be played. However, if the performance or efficiency of the automobile drops below a threshold, a different series of tunes may be generated.

One advantage is that the vibrations of and/or caused by the electric motor may be used to create an audible noise so that pedestrians may more easily hear the automobile as it approaches. Another advantage is that the system generates these vibrations using components that may already be deployed in the automobile, thus minimizing the impact on manufacturing costs. A further advantage is that the vibrations are easily adjusted because variations may be created electronically (i.e., by changing the vibrations currents). Thus, the end user may easily be provided with a means to personalize his or her automobile.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for operating an automotive electric motor comprising first and second components, the method comprising:
    selecting one or more desired frequencies of vibration for the electric motor;
    generating synchronous reference frame current commands;
    generating, at a waveform generator, synchronous reference frame vibration current commands;
    modulating the synchronous reference frame vibration current commands based upon input signals received from an acoustic sound sequencer storing sets of characteristics corresponding to the one or more frequencies of vibration;
    summing the synchronous reference frame current commands and the modulated synchronous reference frame vibration current commands along the q-axis of a d-q coordinate system of the synchronous reference frame to generate modified synchronous reference frame current commands that are characterized by a combined current vector that has an amplitude in the synchronous reference frame that varies in accordance with the desired frequencies of the synchronous reference frame vibration current commands; and
    generating three-phase stationary reference frame currents based on the modified synchronous reference frame current commands, wherein the three-phase stationary reference frame currents are modulated at the desired frequencies as the amplitude of the combined current vector varies and flow through at least one of the first and second components such that the second component moves relative to the first component such that the motor vibrates at the desired frequencies.

2. The method of claim 1, wherein the three-phase stationary reference frame currents flowing through the at least one of the first and second components is substantially on the combined current vector at the first current control angle on the d-q coordinate system associated with the synchronous reference frame and causes a first force to be generated between the first and second components, and
    wherein the modulating of the modified synchronous reference frame current commands causes modulation of the combined current vector on the d-q coordinate system associated with the synchronous reference frame, wherein when the combined current vector is at a current control angle on the d-q coordinate system associated with the synchronous reference frame, a second force is generated between the first and second components, the second force being less than the first force.

3. The method of claim 2, wherein the first component is a stator comprising at least one winding and the second component is a rotor comprising at least one magnet, and wherein the rotor is rotatably coupled to the stator.

4. The method of claim 3, wherein the movement of the rotor relative to the stator comprises rotation of the rotor relative to the stator and the first and second forces are torques applied to the rotor.

5. The method of claim 4, wherein the one or more desired frequencies are each greater than or equal to 20 Hertz (Hz).

6. The method of claim 5, further comprising:
    selecting one or more second desired frequencies of vibration that are above 20 Hz; and
    modulating the current such that the motor vibrates at the one or more second desired frequencies.

7. The method of claim 4, wherein the one or more desired frequencies are each less than 20 Hz.

8. The method of claim 1, wherein the synchronous reference frame current commands that are characterized by a stationary current vector that has a first current control angle and a first amplitude in the synchronous reference frame.

9. The method of claim 8, wherein the synchronous reference frame vibration current commands are characterized by a vibration current vector that varies in accordance with the one or more desired frequencies, wherein the vibration current vector has a second current control angle and a second amplitude in the synchronous reference frame that vary as the synchronous reference frame vibration current commands are modulated.

10. The method of claim 9, wherein the combined current vector has a third current control angle in the synchronous reference frame that is determined based on the first and second current control angles.

11. A method for operating an automotive electric motor comprising a stator having at least one winding and a rotor having at least one magnet and being rotatably coupled to the stator, the method comprising:

selecting one or more desired frequencies of vibration for the electric motor;

generating synchronous reference frame current commands;

generating, at a waveform generator, synchronous reference frame vibration current commands at the one or more desired frequencies of vibration;

summing the synchronous reference frame current commands and the synchronous reference frame vibration current commands to generate modified synchronous reference frame current commands that are characterized by a combined current vector that has an amplitude in the synchronous reference frame that varies in accordance with the desired frequencies of the synchronous reference frame vibration current commands; and generating three-phase stationary reference frame currents based on the modified synchronous reference frame current commands, wherein the three-phase stationary reference frame currents are modulated at the desired frequencies as the amplitude of the combined current vector varies and flow through the at least one winding such that a torque is applied to the rotor that causes the rotor to rotate relative to the stator such that the motor vibrates at the desired frequencies;

wherein the synchronous reference frame vibration current commands comprise a time varying quantity combined with the synchronous reference frame current commands along the q-axis of a d-q coordinate system of the synchronous reference frame.

12. The method of claim 11, wherein the synchronous reference frame current commands that are characterized by a stationary current vector that has a first current control angle and a first amplitude in the synchronous reference frame.

13. The method of claim 12, wherein the synchronous reference frame vibration current commands are characterized by a vibration current vector that varies in accordance with the one or more desired frequencies, wherein the vibration current vector has a second current control angle and a second amplitude in the synchronous reference frame that vary as the synchronous reference frame vibration current commands are modulated.

14. The method of claim 13, wherein the combined current vector has a third current control angle in the synchronous reference frame that is determined based on the first and second current control angles.

15. An automotive drive system comprising:

an electric motor comprising a stator having at least one winding and a rotor having at least one magnet and being rotatably coupled to the stator;

a direct current (DC) power supply coupled to the electric motor;

a power inverter comprising at least one transistor and coupled to the electric motor and the DC power supply to receive DC power from the DC power supply and provide alternating current (AC) power to the electric motor;

a controller in operable communication with the electric motor, the DC power supply, and the power inverter, wherein the controller comprises:

a waveform generator configured to receive a signal representative of one or more desired frequencies of vibration for the electric motor, and to generate synchronous reference frame vibration current commands at the one or more desired frequencies of vibration;

summer modules configured to sum synchronous reference frame current commands and the synchronous reference frame vibration current commands to generate modified synchronous reference frame current commands that are characterized by a combined current vector that has an amplitude in the synchronous reference frame that varies in accordance with the desired frequencies of the synchronous reference frame vibration current commands;

transformation modules configured to transform the modified synchronous reference frame current commands into three-phase stationary reference frame voltage commands; and an inverter module configured to generate three-phase stationary reference frame currents based on the three-phase stationary reference frame voltage commands, wherein the three-phase stationary reference frame currents are modulated at the desired frequencies as the amplitude of the combined current vector varies and flow through the at least one winding such that a torque is applied to the rotor that causes the rotor to rotate relative to the stator such that the electric motor vibrates at the desired frequencies;

wherein the synchronous reference frame vibration current commands comprise a time varying quantity combined with the synchronous reference frame current commands along the q-axis of a d-q coordinate system of the synchronous reference frame.

16. The automotive drive system of claim 15, wherein the synchronous reference frame current commands that are characterized by a stationary current vector that has a first current control angle and a first amplitude in the synchronous reference frame.

17. The automotive drive system of claim 16, wherein the synchronous reference frame vibration current commands are characterized by a vibration current vector that varies in accordance with the one or more desired frequencies, wherein the vibration current vector has a second current control angle and a second amplitude in the synchronous reference frame that vary as the synchronous reference frame vibration current commands are modulated.

18. The automotive drive system of claim 17, wherein the combined current vector has a third current control angle in the synchronous reference frame that is determined based on the first and second current control angles.

* * * * *